(12) United States Patent
Pance et al.

(10) Patent No.: US 11,061,643 B2
(45) Date of Patent: *Jul. 13, 2021

(54) DEVICES WITH ENHANCED AUDIO

(71) Applicant: Apple Inc., Cupertino, CA (US)

(72) Inventors: Aleksandar Pance, Saratoga, CA (US); Brett Bilbrey, Sunnyvale, CA (US); Darby E. Hadley, Birmingham, MI (US); Martin E. Johnson, Los Gatos, CA (US); Ronald Nadim Isaac, San Ramon, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/002,653

(22) Filed: Aug. 25, 2020

(65) Prior Publication Data

US 2020/0389623 A1 Dec. 10, 2020

Related U.S. Application Data

(63) Continuation of application No. 16/512,086, filed on Jul. 15, 2019, now Pat. No. 10,771,742, which is a
(Continued)

(51) Int. Cl.
*H04N 7/15* (2006.01)
*G06F 3/16* (2006.01)
(Continued)

(52) U.S. Cl.
CPC ............ *G06F 3/165* (2013.01); *G06F 3/0484* (2013.01); *G06F 3/167* (2013.01); *G10L 17/00* (2013.01);
(Continued)

(58) Field of Classification Search
CPC .......... H04N 7/15; H04N 5/232; G10L 17/00; G06F 3/0484; H04H 60/04
(Continued)

(56) References Cited

U.S. PATENT DOCUMENTS

2005/0002535 A1* 1/2005 Liu ........................ H04H 60/04
381/58
2005/0147257 A1 7/2005 Melchior et al.
(Continued)

FOREIGN PATENT DOCUMENTS

JP 2007-134939 5/2007

OTHER PUBLICATIONS

Notice of Preliminary Rejection for Korean Application No. 10-2020-0055710 dated Jan. 19, 2021, 8 pages.
(Continued)

*Primary Examiner* — Melur Ramakrishnaiah
(74) *Attorney, Agent, or Firm* — Womble Bond Dickinson (US) LLP

(57) ABSTRACT

A system for enhancing audio including a plurality of sensors, an output device, and a processor in communication with the plurality of sensors and the output device. The processor is configured to process data captured by the plurality of sensors, and based on that, modify an output of the output device. The processor also is configured to determine whether there are a plurality of users associated with a video conferencing session, determine which user of the plurality of users is speaking, and enhance the audio or video output of the speaking user on the output device.

23 Claims, 11 Drawing Sheets

Related U.S. Application Data continuation of application No. 15/592,983, filed on May 11, 2017, now Pat. No. 10,402,151, which is a continuation of application No. 13/193,461, filed on Jul. 28, 2011, now abandoned.

(51) Int. Cl.

| | | |
|---|---|---|
| *H04N 21/422* | (2011.01) | |
| *H04N 21/439* | (2011.01) | |
| *H04N 21/442* | (2011.01) | |
| *H04N 21/4143* | (2011.01) | |
| *H04N 21/4223* | (2011.01) | |
| *H04S 7/00* | (2006.01) | |
| *G06F 3/0484* | (2013.01) | |
| *G10L 17/00* | (2013.01) | |
| *H04N 5/232* | (2006.01) | |
| *H04R 3/04* | (2006.01) | |
| *H04R 29/00* | (2006.01) | |
| *H04N 5/60* | (2006.01) | |
| *H04N 7/14* | (2006.01) | |
| *H04N 21/45* | (2011.01) | |
| *H04N 21/485* | (2011.01) | |

(52) U.S. Cl.
CPC .......... *H04N 5/23296* (2013.01); *H04N 7/15* (2013.01); *H04N 21/4143* (2013.01); *H04N 21/4223* (2013.01); *H04N 21/42201* (2013.01); *H04N 21/42202* (2013.01); *H04N 21/42203* (2013.01); *H04N 21/439* (2013.01); *H04N 21/44218* (2013.01); *H04R 3/04* (2013.01); *H04R 29/001* (2013.01); *H04S 7/303* (2013.01); *H04S 7/305* (2013.01); *H04N 5/60* (2013.01); *H04N 7/142* (2013.01); *H04N 21/42222* (2013.01); *H04N 21/4532* (2013.01); *H04N 21/4852* (2013.01); *H04R 2430/01* (2013.01); *H04S 2400/13* (2013.01)

(58) Field of Classification Search
USPC ............. 348/14.01–14.16, 211.12, 152, 143; 381/58
See application file for complete search history.

(56) References Cited

U.S. PATENT DOCUMENTS

| | | | |
|---|---|---|---|
| 2006/0256983 A1 | 11/2006 | Kenoyer et al. | |
| 2007/0011196 A1 | 1/2007 | Ball et al. | |
| 2008/0130923 A1 | 6/2008 | Freeman | |
| 2010/0309284 A1* | 12/2010 | Samadani | H04N 21/42203 348/14.08 |
| 2011/0063405 A1* | 3/2011 | Yam | H04N 21/4788 348/14.08 |
| 2011/0069643 A1* | 3/2011 | Yoakum | H04L 65/4015 370/261 |

OTHER PUBLICATIONS

Office Action and Search Report for Chinese Application No. 201811516169.7 dated Mar. 1, 2021, 17 pages.

* cited by examiner ately to the environment, surroundings, circumstances, program, and/or environment. However, many audio and video output devices may require a user input or interaction in order to change a particular output or may not have variable output settings. In these instances the audio and/or video output may not be performing or outputting the best quality sound or images for the particular environment, programs, circumstance, or the like.

SUMMARY

Examples of the disclosure may take the form of a method for outputting audio from a computing device. The method may include detecting a user by a sensor. Once a user is detected, a process determines whether the user is an optimum range for a current audio output of an audio output device. If the user is not within the optimum range, the processor modifies the audio output. Additionally, the sensor determines whether the user is orientated towards the computing device. Based on the user orientation the processor adjusts an audio device.

Other examples of the disclosure may take the form of a method for enhancing audio for a computer. The method may include determining by a sensor a user location relative to the computer. Once the user location has been determined, the sensor may gather environment data corresponding to an environment of the computer. Then, a processor adjusts an audiovisual setting view of the environment data and the user location.

Still other examples of the disclosure may take the form of a system for enhancing audio including a computer and an output device. The computer includes a sensor configured to determine a user location relative to the computer. The sensor is also configured to gather environment data corresponding to an environment of the computer. The computer also includes a processor in communication with the sensor and configured to process the user location and the environment data and adjust at least one of an audio output or a video output. The output device is in communication with the processor and is configured to output at least one of the audio output or the video output.

DETAILED DESCRIPTION

Overview

Figure 1A:
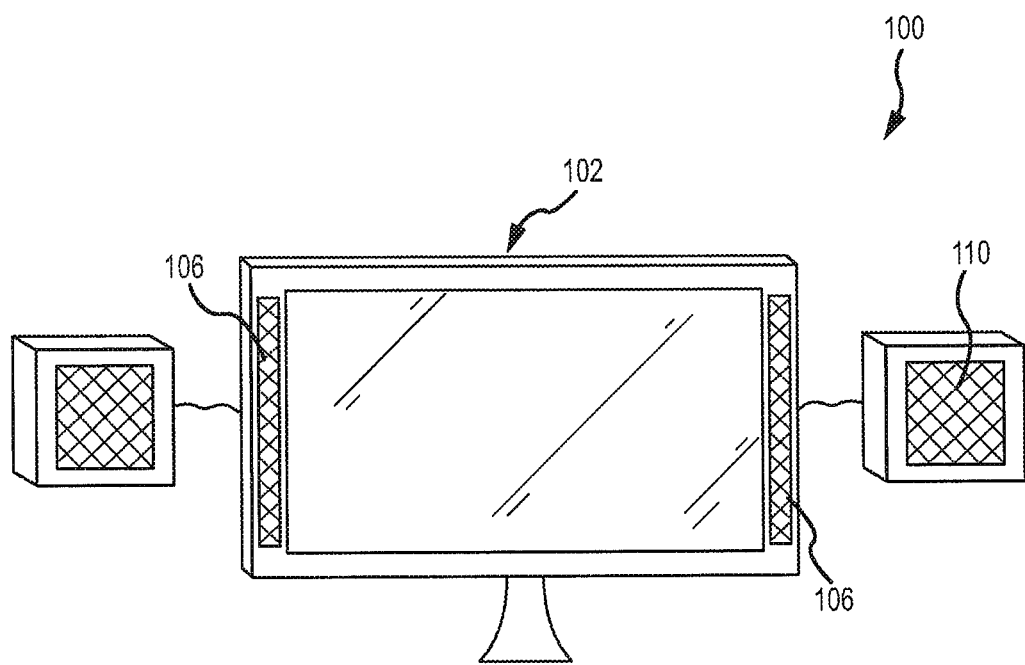
FIG. 1A is a diagram illustrating a system for enhancing audio output.

In some embodiments herein, the disclosure may take the form of a method to enhance audio output from an electronic device based on one or more criteria, such as an active application, user interactions, and environmental parameters. The method may also include providing user input without significant (if any) active user interaction. In other words, the system may rely on sensors and imaging devices to interpolate user inputs so that the user may not have to physically or knowingly enter them into the system. This may allow for an audio output device to dynamically adjust to different user parameters to enhance the audio output without requiring active inputs from the user directly.

In one embodiment, the system may enhance the audio output for a video conferencing or chat. Some users may use video conference to have conversations with a group of people. For example, a parent traveling may video conference with the entire family, including children and a spouse. With groups of people, some people may be positioned closer or farther away from the computer. Additionally, there may be multiple different people talking at a single time. During video conferencing, the user on the receiving end may have a difficult time determining what each person is saying, especially if there are multiple people talking at a single time.

The system may capture images of the different users (e.g., via a video camera) and the receiving user may be able to enhance the audio for a particular user. For example, the receiving user may tap on the image of the particular user (or otherwise select or indicate the user) upon whom he or she wishes the embodiment to focus, and the system may digitally enhance the audio as well as steer a microphone towards the user in order to better capture the user's audio input. In one example, the system may include a computer having multiple microphones spaced around a perimeter of a display screen, and the particular microphones may be turned on/off as well as rotated in order to best capture a desired audio signal.

Similarly, the system may also be configured to direct a microphone, enhance the audio and/or focus the video image on a person that is speaking. Mouth tracking or speech recognition may be used to focus the audio and/or video on a particular user that is speaking. This may allow a user receiving an audio data stream to better be able to hear the user speaking (e.g., the transmitting user of the system). Thus, the enhancement feature of either or both of the audio or video images of a user may be automatic (e.g., based on mouth tracking or speech recognition) or may be based on user input (e.g., a user can select a user or focus area).

Output audio quality may depend, at least partially, on the environment. For example, echo cancellation may be desired and/or affected by the size and acoustics of the room. Two factors that may affect the quality of output audio may include room dimension and reverberant qualities. In one embodiment, the system may be configured to adjust the audio output depending a user's location with respect to the audio output device, the user's position (e.g., facing head-on or turned away) with respect to the audio output device, and environmental inputs (such as the size of the room, reverberation of the room, temperature, and the like). The user's inputs may include his or her location within a room, whether he or she is facing the audio output device and the like. Furthermore, the system may vary the audio output not only based on the user and environmental inputs, but also the current application that the computer or audio output device may be running. For example, if the application is a telephone call the response may be varied as compared with a music player application.

In various embodiments the system may include video, audio, and environmental sensors. For example, image sensors (e.g., cameras), depth sensors (ultrasonic, infrared, radio frequency and so on), and the like may be used. Additionally, the desired output may also be changed based on a user location to the computer, e.g., if a user is far away from the computer in a large room versus if a user is close to the computer in small room. For example, if an object is presented in a video as being positioned far away from the user, the output audio of the particular object (or user) may be varied in order to sound to the user as though the object is far away. In this implementation, depth may be provided to local audio of a far-field image in order to enhance the overall audio/visual experience of the user.

In still other embodiments, the system may be configured to adjust an output audio based on the user. Men, women, and children may all have different hearing spectrums, generally women may hear better than men and children may hear better than either men or women adults. The system may utilize speech or facial recognition or other gender identifying techniques in order to vary the output audio depending on the particular user.

Exemplary System

In an exemplary embodiment, the disclosure may take the form of a system for providing an enhanced audio experience for a user. FIG. 1A is a block diagram of an exemplary system 100 for providing enhanced audio. The system 100 may include a computer 102 or other electronic device and audio output devices 106, 110 (which may be integrated, separate or a combination of both from the computer 102).

The computer 102 may be substantially any type of electronic device with processing capabilities, including, but not limited to, a laptop, tablet, smart phone, audio player, and television. In this embodiment, the computer 102 is in communication with an external audio output device 110 and an integrated audio output device 106. However, it should be noted that in some instances, the system 100 may include a single audio output device 106, 110 or may include multiple other audio output devices (e.g., surround-sound 5-speaker system). The audio output devices 106, 110 may be a speaker or set of speakers, headphones, or other device capable of producing a sound in response to an electronic signal.

The audio devices 106, 110 may be positioned substantially anywhere on the computer 102 and/or around the computer 102. The type, power, and structure of the audio devices 106, 110 may effect the quality of the audio produced from the computer 102, as well as may effect the various software changes that may be needed to produce the best sound.

Figure 1B:
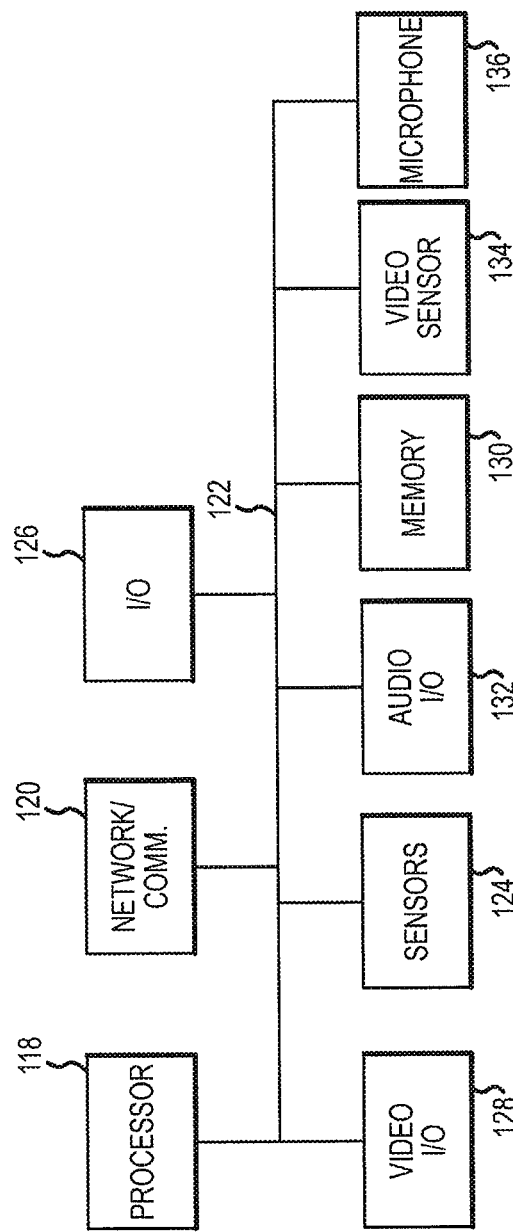
FIG. 1B is a block diagram of a computer of the system of FIG. 1A.
Figure 2:
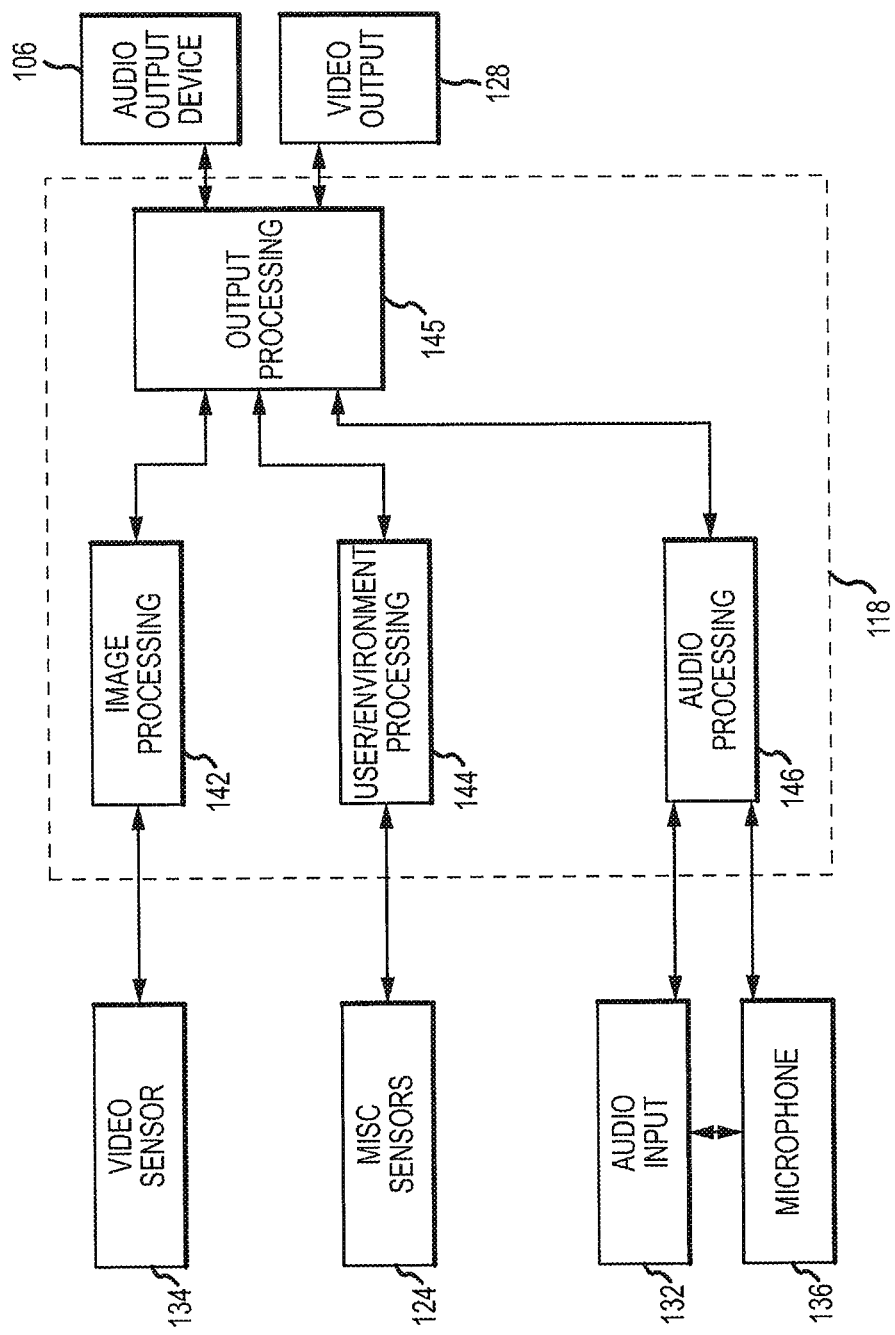
FIG. 2 is a block diagram of the system of FIG. 1A with select audio and video processing paths illustrated.

FIG. 1B is a block diagram of an exemplary computer 102. The computer 102 may include a processor 118, a network/communication interface 120, an input/output interface 126, a video input/output interface 128, sensors 124, memory 130, audio input/output interface 132, video sensor 134, and/or a microphone 136. The various computer 102 components may be electronically connected together via a system bus 122 (or multiple system buses). It should be noted that any of the various components may be omitted and/or combined. For example, the video input/output interface 128 may be combined with either or both the audio input/output interface 132 and the general input/output interface 126. Furthermore, the computer 102 may include additional local or remote components that are not shown; and FIG. 2 is meant to be exemplary only.

The processor 118 may control the operation of the computer 102 and its various components. The processor 118 may be substantially any electronic device cable of processor, receiving, and/or transmitting instructions. For example, the processor 118 may be a microprocessor or a microcomputer.

The network/communication interface 120 may receive and transmit various electrical signals. For example, the network/communication interface 120 may be used to connect the computer 102 to a network in order to transmit and receive signals to and/or from other computers or electronic devices via the network. The network/communication interface 120 may also be used to transmit and send electronic signals via a wireless or wired connection (including, but not limited to, Internet, WiFi, Bluetooth, Ethernet, USB, and Firewire).

The memory 130 may store electronic data that may be utilized by the computer 102. For example, the memory 130 may store electrical data containing any type of content, including, but not limited to, audio files, video files, document files, and data files. Store data may correspond to one or more various applications and/or operations of the computer. The memory 130 may be generally any format, including, but not limited, to non-volatile storage, a magnetic storage medium, optical storage medium, magneto-optical storage medium, electrical storage medium, read only memory, random access memory, erasable programmable memory, and flash memory. The memory 130 may be provided local to and/or remote from the computer 102.

The various input/output interfaces 126, 128, 132 may provide communication to and from input/output devices. For example, the audio input/output interface 132 may provide input and output to and from the audio devices 106, 110. Similarly, the video input/output interface 128 may provide input and output to a display device (e.g., computer monitor, display screen, or television). Additionally, the general input/output interface 126, 128, 132 may receive input from control buttons, switches and so on. In some embodiments, the input interfaces may be combined. For example, the input/output interfaces 126, 128, 132 may receive data from a user (e.g., via a keyboard, touch sensitive surface, mouse, audible input or other device), control buttons on the computer 102 (e.g., power button, volume buttons), and so on. Additionally, the input/output interface 112 may also receive/transmit data to and from an external drive, e.g., a universal serial bus (USB), or other video/audio/data inputs.

Figure 1C:
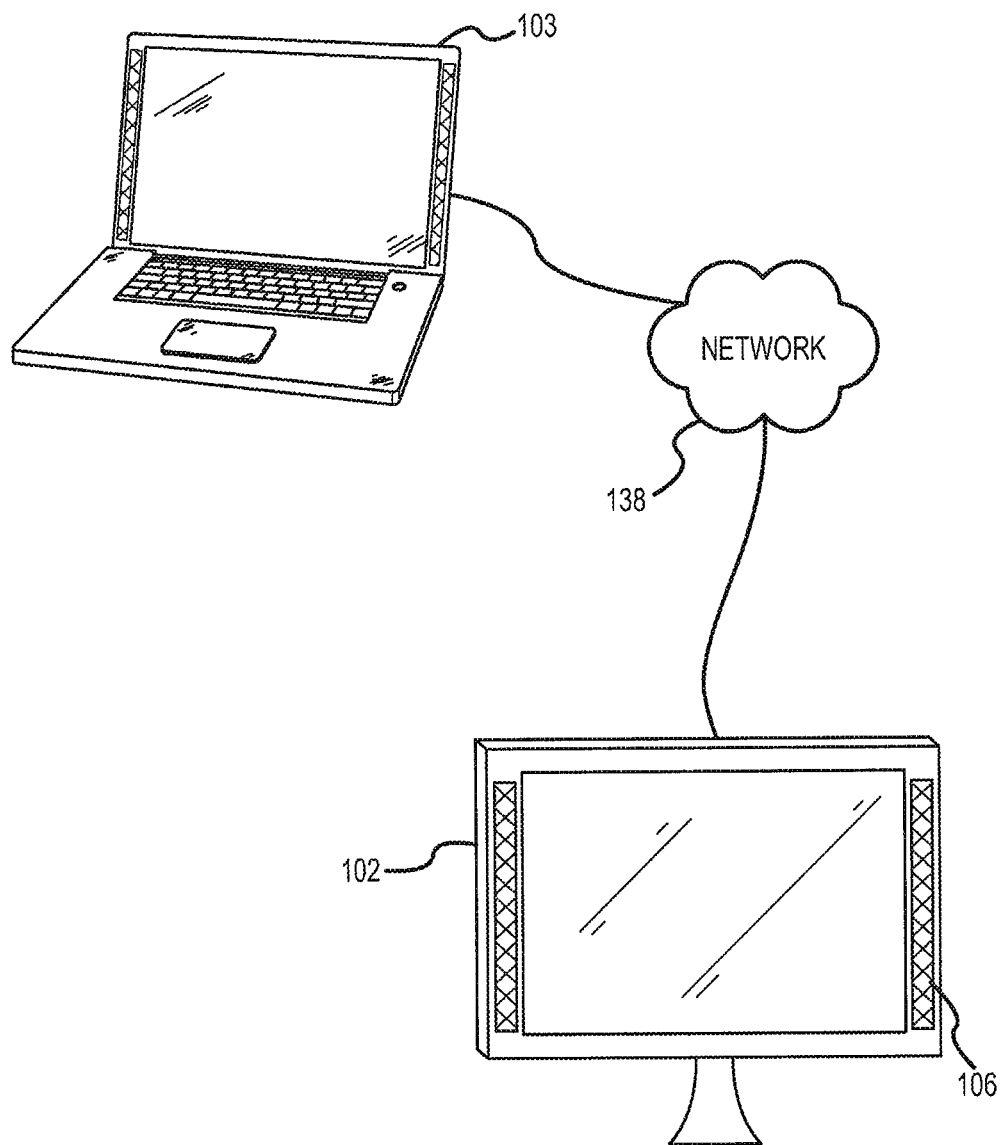
FIG. 1C is a diagram illustrating the computer in communication over a network with a second computer.

As can be seen in FIG. 1C, in some instances, the computer 102 may be in communication with a second computer 103 via a network 138. Additionally, as shown in FIG. 1C, in some instances, the computer 102 may be connected via a network 140 to another or second computer 103 (or server). For example, the computer 102 may connect with the second computer 103 for conferencing or chat applications. Additionally, the computer 102 may receive streaming audio and/or video from the second computer 103.

The network 138 provides electronic communication between the first computer 102 and the second computer 103. The network 138 may be virtually any type of electronic communication mechanism/path and may be wireless, wired, or a combination of wired and wireless. The network 138 may include the Internet, Ethernet, universal serial bus (USB) cables, or radio signals (e.g., WiFi, Bluetooth).

The microphone 136 may be integrated to the computer 102 or separately attached and in communication with the processor 118. The microphone 136 is an acoustic to electric transmitter and is configured to receive an audio input and produce an electrical output corresponding to the audio. There may be multiple microphones 136 incorporated or otherwise in communication with the computer 102. For example, in some implementations, there may be a microphone array of multiple microphones positioned at various locations around the computer 102.

The video sensor 134 may be a video or image capturing device(s). The video sensor 134 may be integrated into the computer 102 (e.g., connected to an enclosure of the computer 102) and/or may be external and in communication with the computer 102. The video sensor 134 may be used to capture video and still images that may be used for various applications such as video conferencing/chat.

FIG. 2 is a block diagram of the system 100 illustrating an exemplary audio/video processing paths from input to output. Referring to FIGS. 1A, 1B, and 2, the system 100 may communicate between various sensors to enhance and adjust an audio and video output. The video sensor 134 may provide video input to the processor 118, the miscellaneous sensors 124 may provide user and environmental data to the processor 118, and the audio input 132 may provide input audio the processor 118. The processor 118 may separately or jointly process the various inputs and adjust a video and audio output to present to the speaker 110 and/or display 104.

In one example, the video sensor 134, sensors 124, and audio input 132 may provide image data regarding the user and/or the environment (e.g., room, surroundings) of the computer 102. The processor 118 may then enhance or alter the audio output characteristics provided to the speaker 110 to provide an enhanced audio experience. The way the audio output may sound to a user may be dependent on or affected by where a user may be located with respect to the audio output device, as well characteristics of the room or environment. If the audio characteristics or settings are not altered, an audio signal that may have a particular sound in a first room may sound drastically different in a second room. For example, if the first room is smaller than the second room or if the first room has carpet and the second room has wood flooring.

Therefore, after receiving video and image input and audio input 132 (e.g., echoing characteristics, location of a user with respect to the computer 102, direction of the user with respect to the computer 102), the audio and video output can be enhanced by the processor 118. This may enable the computer 102 to adjust the audio and/or video to best accommodate the user and/or environment.

As can be seen in FIG. 2, the processor 118 may include separate processing units, such as an image processing unit 142, a user/environment interface processing unit 144, an audio processing unit 146, and an output processing unit 145. These processing units 142, 144, 145, 146 may be integrated into the processor 118 or may be separate devices. Each processing unit 142, 144, 145, 146 may be in communication with a particular sensor in order to receive output from the sensors as well as to adjust the sensor inputs. For example, the audio processing unit 146 may direct or steer the microphone 136 towards a particular user speaking to better capture his or her voice. Similarly, the image processing unit 142 may focus or zoom the video sensor 134 on a particular user. In still other examples, the user/interface processing unit 144 may direct particular sensors 124 to gather additional environmental/user data. Additionally, the output processing 145 may include frequency filters to post-process an audio signal (e.g., to reduce noise frequencies, enhance particular frequencies, and so on), correct errors in audio levels, adjust loudness to a particular level (e.g., equalize an audio output), echo-cancellation, peaking filters and so on.

Adjusting Audio Output Based on User Location and Position

Figure 3:
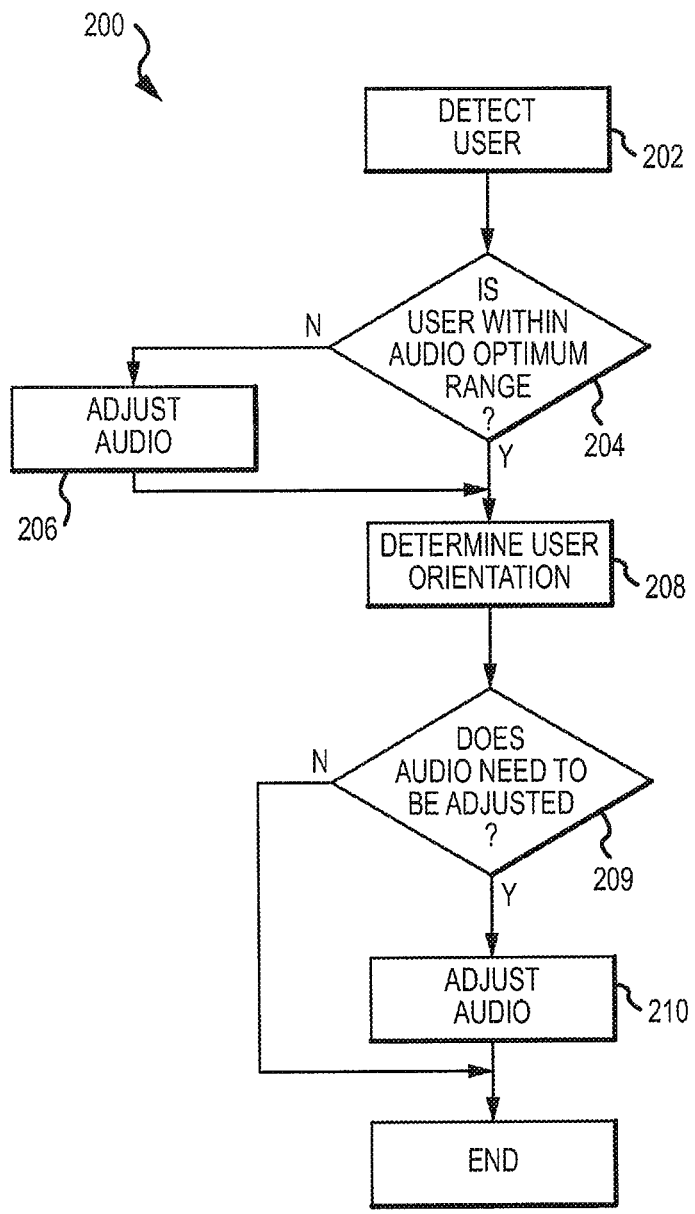
FIG. 3 is a flow chart illustrating an exemplary method for adjusting an audio output based on a user location and position.

FIG. 3 is a flow chart illustrating an exemplary method 200 for adjusting an audio output based on a user location and position. The method 200 may begin with operation 202 and the computer 102 may detect a user or users. The computer 102 may utilize the sensors 124 to capture motion, may utilize the video sensor 134 to capture and analyze an image (e.g., facial recognition), or may utilize the audio sensors 132 to capture noise may by a user or users.

Once a user or user is detected, the method 200 may proceed to operation 204 and the computer 102 may determine if the user or users are within an optimum range based on the current audio output settings and speaker 110 arrangement. For example, the computer 102 may determine a user location utilizing various sensors. The computer 102 may use the same sensors and methods to detect a user's presence to determine the user's location with respect to the computer 102 and/or the speakers 110. The detection of a user's location may be an estimate or single input, e.g., the computer 102 may simply detect that a user is not directly in front of the computer 102, or the detection may be more detailed and the computer 102 may utilize more advanced sensing techniques to determine the approximate location of the user with respect to the computer 102.

Once the user's location is determined, the computer 102 may compare the user's location with the current audio output settings to determine whether the audio is within an optimum range based on the position of the user. As one example, if the user is located a few yards away from the computer 102 and the audio is configured to output as if the user were sitting directly in front the of the speakers 110 or computer 102, the audio may need to be adjusted. The audio may be adjusted for the user so that the volume may be increased, the external speakers 110 may be turned on, internal speakers 106 turned off, surround sound may be switched from a "screen channels" setting into a surround sound format, or the surround sound channels may be redirected from internal speakers to external speakers and to left-surround channels and right-surround channels. On the other hand, if the audio is already adjusted or configured with a distance setting, the audio may not need to be adjusted based on the user's location.

If the audio needs to be adjusted in order to be best suited for the user's location, the method 200 may proceed to operation 206. Operation 206 may adjust the audio based on the user's location. If the user is positioned away from the computer 102 or speakers 106, 110, the computer 102 may activate the external speakers 110 and turn off the internal speakers 106. For example, the external speakers 110 may form a part of a surround sound speaker array and therefore may provide a better "room" sound experience as compared with the internal computer speakers 106. Similarly, if the user is directly in front of the computer 102, the computer 102 may adjust the audio so that the internal speakers 106 are activated.

Additionally, the computer 102 may adjust various audio settings, including, but not limited to the volume, bass, treble, frequency band levels. This may allow the audio signal to be adjusted, even if there may only be a single set of speakers 106, 110 and/or the speakers 106, 110 may not be adjusted.

Once the audio is adjusted based on the user's location, or if the audio did not need to be adjusted in operation 204 because the user was already within the set audio range, the method 200 may proceed to operation 208. In operation 208, the embodiment determines whether the user is oriented towards the computer 102. This may be an optional operation as if the user is located a far distance from the computer 102, it may be difficult (without powerful sensors) to determine if the user is facing the computer 102. However, in other embodiments, if the user is relatively close to the computer 102 or if the system 100 includes appropriate sensors, the computer 102 may determine the user's respective orientation with respect to the computer 102. Also, it should be noted that in some embodiments, the user's orientation may be determined with respect to the speakers 106, 110. This may be done by including sensors on the speakers 106, 110 or by implementing the user's orientation with respect to the computer 102 to compare with the location of the speakers 106, 110 with respect to the computer 102.

In operation 208, the computer 102 may capture or otherwise provide an image of the user via the video sensor 134. The image processing unit 146 may utilize gaze tracking to track the gaze of the user's eyes, facial recognition or other similar methods to determine if the user's head direction with respect to the computer 102. Once the user's orientation with respect to the computer 102 is determined, the method 200 may proceed to operation 210.

Operation 210 adjusts the audio output device and optionally a user input device to accommodate a new user location. For example, the computer 102 may vary the speakers 106, 110 and/or audio signal to better accommodate the direction of the user. Further, if the user has been utilizing the microphone 136 (e.g., for a phone call, video chat, dictation), the computer 102 may steer the microphone 136 towards the direction of the user's mouth. After operation 210, the computer 102 may present the audio signal to the speakers 106, 110.

Figure 4:
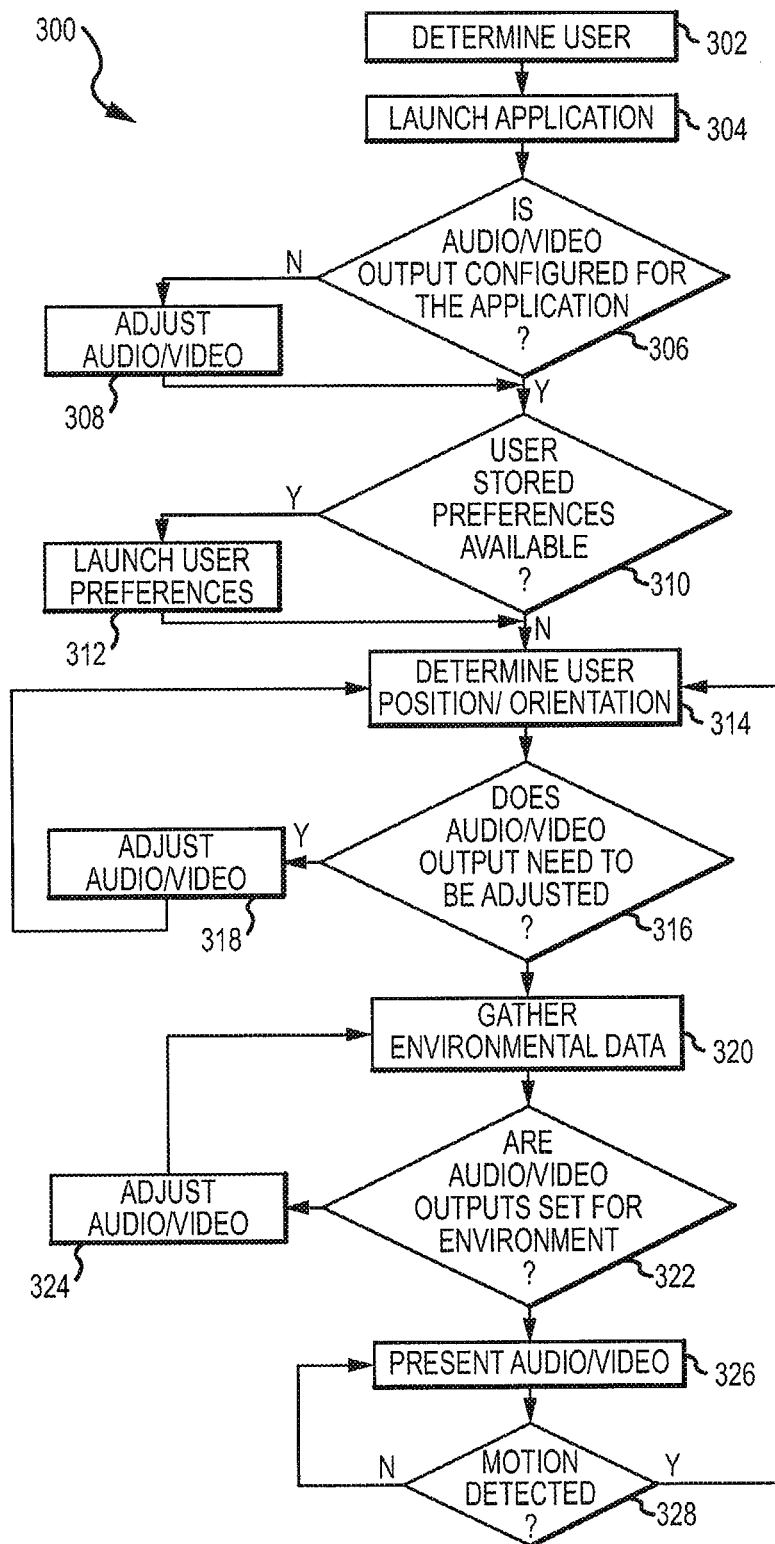
FIG. 4 is a flow chart of an exemplary method for enhancing an audio and/or video output.

In other embodiments, the system 100 may be used to enhance audio and/or video output depending on user and/or program preferences. FIG. 4 is a flow chart of an exemplary method 300 for enhancing an audio and/or video output. The method 300 may begin with operation 302 and the computer 102 may determine a particular user utilizing the computer 102. Operation 302 may be determined at startup where a user may enter a user name and/or password. Alternatively or additionally, the computer 102 may determine a user utilizing the device in another manner, e.g., default user, security system, facial recognition, or the like. After the user is determined, the method 300 may proceed to operation 304 and the user (or computer 102) may launch a particular application. The application may be a video conferencing/chat program, a music player, video player, and the like. The application may include an audio and/or video/image aspects.

After an application is launched, or while the application is being launched, the method 300 may proceed to operation 306. Operation 306 determines whether the audio and/or video settings of the computer 102, speakers 106, 110 and/or display device 104 are configured for the particular application. For example, the audio settings of the computer 102 and speakers 106, 110 may be configured to play music, whereas the application launched may be a video conferencing or teleconferencing program. In this example, the audio and speakers 106, 110 may be adjusted to better accommodate voice frequencies as opposed to music frequencies, or other characteristics. For example, voice frequencies may generally be lower and have a smaller range as compared with musical frequencies which may be larger and include a larger range. Therefore, if the audio is mostly people talking, the audio may be processed through a band pass filter so that the smaller range of voice frequencies may be enhanced. Similarly, if the audio is music the audio may be non-filtered or include noise filters so as to be able to output all frequency ranges.

If in operation 306, the computer 102 determines that the audio or video settings or output devices (speakers 106, 110, display 104) may need to be adjusted, the method 300 process to operation 308. Operation 308 adjusts the relative output signals, settings and/or output devices to better correlate to the particular application.

Once the audio and/or video have been configured for the particular application, the method 300 may proceed to operation 310. Operation 310 determines whether the user has previously stored preferences. The computer 102 may have stored previously adjusted settings by the particular user determined to be utilizing the computer 102 in operation 302. The computer 102 may automatically store any settings adjusted by the particular user for select applications (or all applications). Or, the user may actively adjust input settings for particular applications or generally for whenever he or she may be using the computer 102.

If the computer 102 has previously stored information regarding the user's preferences, the method 300 may proceed to operation 312. Operation 312 launches the user's particular preferences. Operation 312 may include activating select output devices (e.g., external speakers 110), adjusting volume, bass, treble, or frequency levels. By automatically adjusting particular devices and settings to accommodate a user's preference, the computer 102 may automatically enhance the audio and/or video output depending on and the desires of a user. Also, it should be noted that the user preferences may be based on audio/video output settings generally or for particular applications. For example, a certain user may prefer that any teleconferencing or video conferencing have much lower volume and only utilize internal speakers 106, whereas when utilizing a music application the user may prefer that the volume be louder and external speakers 110 and the integrated speakers 106 be used.

Furthermore, it should be noted that the user preferences may include settings for when multiple separate applications are launched simultaneously. Multiple separate applications may include when a user is utilizing a music player and a video chat application and may include a modified setting that is different from either of the applications separately.

Once the user preferences have been activated or there are no previously stored/saved user preferences, the method 300 may proceed to operation 314. Operation 314 determines a user distance, position and/or location with respect to the computer 102. This may be similar to the method 200 illustrated in FIG. 2. For example, the computer 102 may utilize the video sensor 134 to capture an image of the user and/or track the movements of the user. A gaze tracking function may be utilized to process the video images in order to determine a gaze direction of the user, that is, which direction a user appears to be looking. Similarly, the computer 102 may utilize other sensors 124, such as infrared, heat, temperature, ultra sonic, or motion sensors to determine an approximate location of the user.

Once the user's position, distance and/or location from the computer 102 is determined, the method 300 may proceed to operation 316. Operation 316 determines when the audio and/or video outputs need to be adjusted based on the user's distance, location and/or position relative to the computer 102. The computer 102 may compare the user's position information with the current audio and/or video settings to see if the audio and/or video settings and/or devices may be adjusted to provide a better output. The settings and/or device information may be stored in a memory 130 for particular range of locations, position and/or distances. Or, the settings and devices may be dynamically adjusted based on a feedback loop or other active adjustment mechanism.

If in operation 316, the audio and/or video output should be adjusted based on the user's position, the method 300 may proceed to operation 318. Operation 318 may adjust the output of the audio and/or video to accommodate the settings that may produce the best output for the particular location of the user and/or the application. For example, if the user's head is turned away from the computer 106 (and thus turned away from internal speakers 106), the audio may be adjusted so that the audio experience may be enhanced to accommodate the user's position and distance. Similarly, if the user is positioned far away from the computer 102, the audio output may be adjusted to have a different output profile and/or the video output display may be enlarged.

The audio output may be adjusted through multiple different methods. The audio output signal may be post-processed prior to being output. For example, the audio may be filtered to enhance or to reduce particular frequencies, may include different channel signals (e.g., surround sound channels), may include different bass or treble settings, and so on. Similarly, the audio adjustment may also be done as the audio is input. For example, the microphone 136 may be directed through beam steering towards the input source, the microphone 136 may have an increased sensitivity for a particular user's voice frequency, other microphones 136 or audio input sensors 132 not directed towards the speaking user may be turned off or lowered, and so on.

Once the audio and/or video output and devices is adjusted, the method 300 may return to operation 314. As the method 300 may return to operation 314, the audio and/or video output and devices may be dynamically adjusted if the user changes his or her position, location, and/or distance from the computer 102. Therefore, the audio and/or video output may be automatically adjusted as the user moves around to provide the best audio and/or video output that may be available based on the user.

If in operation 316, the audio and/or video output may already been adjusted based on the user's position, the method 300 may proceed to operation 320 and environmental data may be gathered. For example, the computer 102 utilizing the sensors 134, the video sensor 134, and/or the audio input 132 may gather characteristics of the environment surrounding the computer 102. The environmental characteristics may be information such as the estimated size of the room/space that the computer 102 may be located, global positioning information, temperature, humidity, reverberant qualities, distance to large objects, and so on.

In one example, the computer 102 (via the audio input/output 132 or speakers 106, 110) may emit a sound, and the sound and its resulting echoes (if any) may be sensed by the microphone 132 and/or other sensors 134. The sensed echoing response and other characteristics of the reverberated audio sound may provide information regarding the size of the room, the reverberant nature of the room, or other similar characteristics.

In another example, information such as global positioning information or signal strength analysis, may be used to determine a location of the computer 102. The location may be determined to be a user's office, home, an outdoor location, and so on (e.g., by being programmed by the user, mapping or other reference information).

Once environmental data is gathered, the method 300 may proceed to operation 322 and the computer 102 may determine whether the audio and/or video outputs are set for the particular environment. For example, if the location of the computer 102 is determined to be in a user's office, the audio and/or video settings may be adjusted to have a lower volume. A user may wish to play audio at a higher volume at home as compared to when he or she is at the office. Similarly, the general room sizes in the office may be smaller (e.g., a user's particular office) than if the computer 102 is used to present audio at a user's home. Furthermore, in some instances, depending on the location of the computer 102, the audio and/or video may be muted or prevented from being displayed, e.g., at an office or classroom.

In another example, the audio output settings for the speakers 106, 110 may need to be adjusted to account for the reverberant qualities or the size of the room of the computer 102. This may include filtering the audio to remove echoing, reduce certain frequencies which may reverberant, or other post processing of the audio. Similarly, the video qualities may need to be adjusted based on the amount of ambient light that may be in the room, e.g., increase or decrease the brightness of a display screen or video signal.

If in operation 322 the computer 102 determines that the audio and/or video settings may need to be adjusted for the particular environment, the method may proceed to operation 324. In operation 324 the computer adjusts the relevant settings to output a best possible sound and/or imaging from the speakers 106, 110 and/or display screen 104. Operation 324 may involve increasing/decreasing a particular setting (e.g., brightness, contrast, treble, bass, volume), varying the output signal in a particular manner (e.g., filtering the signal to reduce or enhance a certain frequency), combining the output signal with another signal or other types of mechanisms for adjusting the output of either or both the audio or video.

Once the audio and/or video is adjusted, the method 300 may proceed back to operation 320. In this manner, the computer 102 may continue to gather environmental data in case aspects of the environment may have changed between the adjustment of the audio and/or video. Similarly, by returning to operation 320, the audio and/or video settings as altered may be verified as being adequate for the particular environment. This may provide a feedback loop so that the settings may be adjusted and then retested (and re-adjusted if necessary).

If after operation 322, the computer 102 determines that the audio and/or video settings are adequate for the particular environment, the method 300 may proceed to operation 326. The computer 102 may then present or transfer to an output device (e.g., a television or speakers 106, 110) the audio and/or video.

As the computer 102 is presenting the audio and/or video, the method 300 may continue to operation 328. In operation 328 the computer 102 may monitor (via sensors 134) whether motion is detected. For example, the sensors 134 may include a motion detector or other movement sensing device, which may track if the user changes his or her position. Similarly, the sensor 134 may also include an accelerometer, which may determine if the computer 102 is moving so that the computer 102 may determine if a user is carrying or otherwise moving the computer 102.

If in operation 328, no motion is detected, the method 300 may return to operation 326. However, if in operation 328 motion is detected, the method 300 may return to operation 314. Therefore, if the user and/or computer 102 moves while the audio and/or video is being presented, the computer 102 may further determine if the audio and/or video settings are adequately set for the updated environment and user position. Therefore, the computer 102 may be able to dynamically adjust the settings of audio and video playback. This may allow the computer 102 to adjust the audio and/or video continuously so that the audio and/or video may be able to be presented with the best (or desire) settings.

Video Conferencing

Figure 5A:
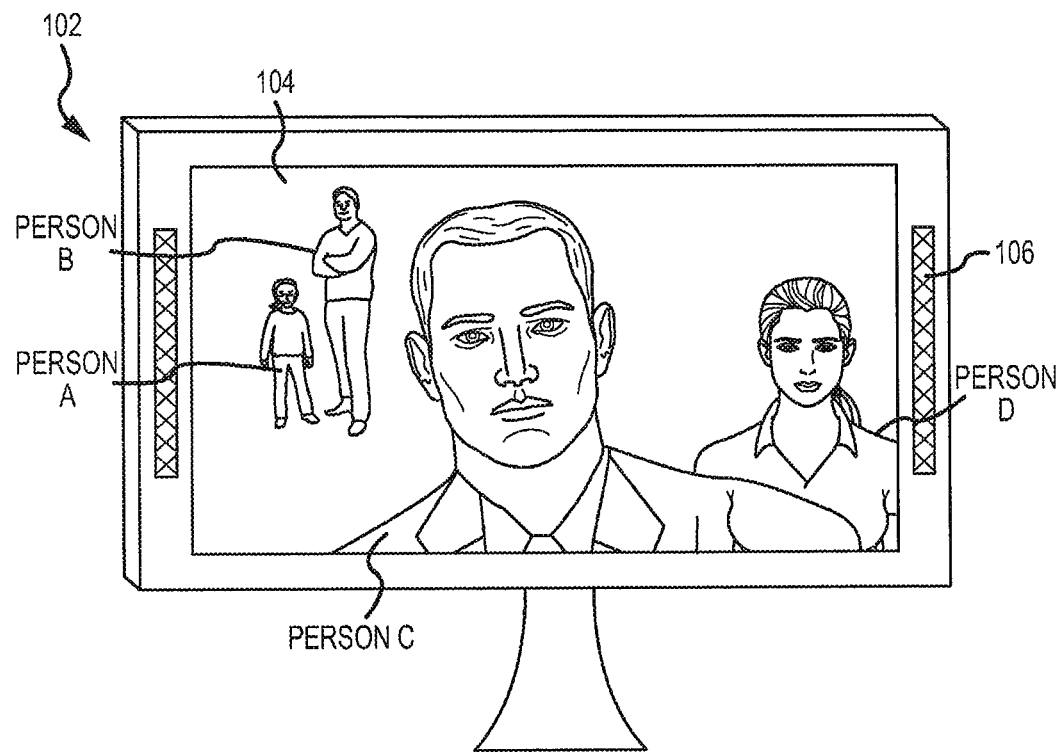
FIG. 5A is a diagram of the computer displaying a multi-person video conference.
Figure 5B:
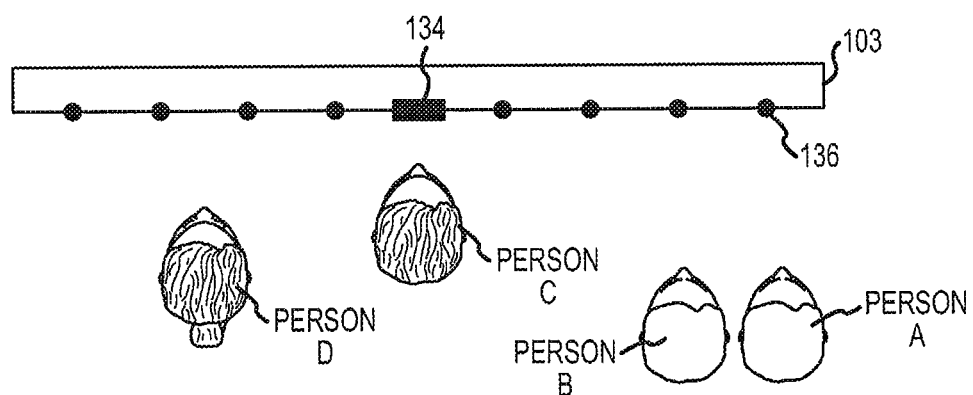
FIG. 5B is a top plan view of users displayed on the computer of FIG. 5A being captured by a second computer.

In other examples, the system 100 may be used to provide an enhanced and user adjustable video conferencing system. FIG. 5A is an example of the computer 102 displaying a multi-person video conference. As can be seen, the display 104 may include images of Person A, Person B, Person C, and Person D. It should be noted that there may be fewer or more people, also the system may be utilized without any people (e.g., as a monitoring system). FIG. 5B is a top plan view of the computer 102 relative to the positions of each of Persons A-D. As shown in FIG. 5B, each Person A-D is positioned at a different location with respect to the computer 102.

As each Person A-D is positioned at different locations and at varying distances from the computer 102, the display of each Person A-D on the computer 102 in FIG. 5A likewise displays the Persons A-D as they are in actuality, that is, at different locations. Additionally, the microphones 136 may also pick up the voices and other sounds of the Persons A-D relative based on his or her position to the computer 102. Therefore, Persons A and B may be shown smaller compared to Person C on FIG. 5A and the sounds from Persons A and B may also be generally outputted as quieter than the sounds from Person C. However, in some instances the user watching the video conference may wish to hear and/or see Persons A and B better or louder. For example, Persons A and B may be talking at the moment and the user may wish to focus the output sound on their voices.

Figure 5C:
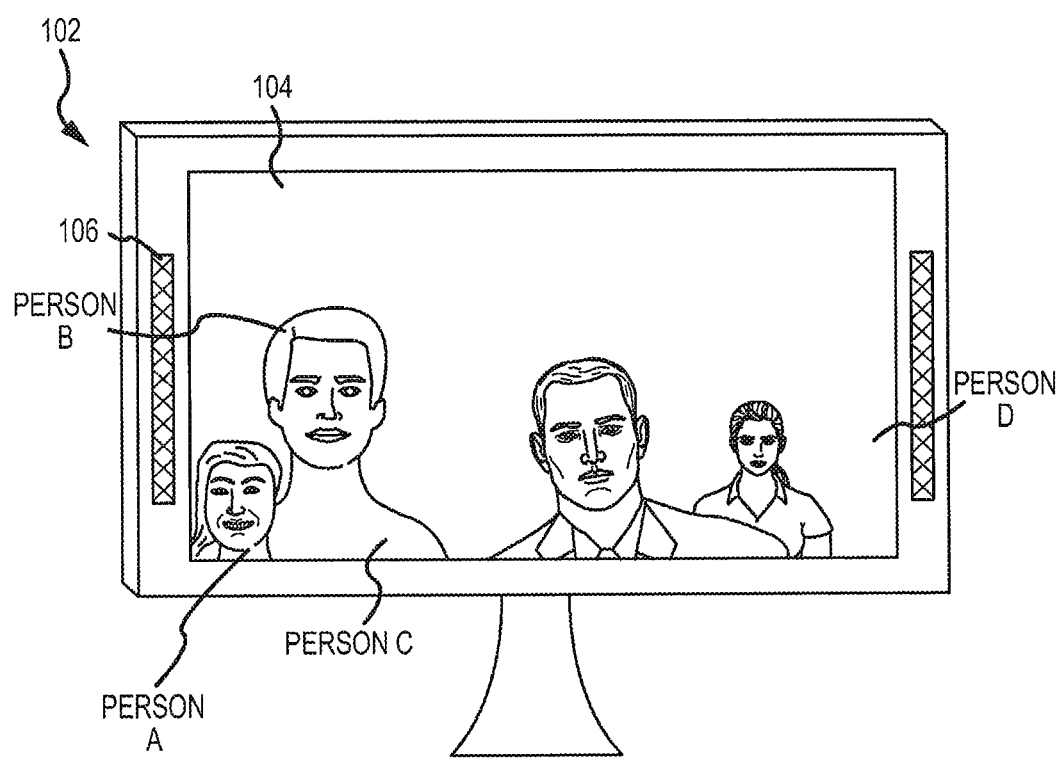
FIG. 5C is a diagram of the computer of FIG. 5A with the audio and video of a Person A and B enhanced.

FIG. 5C illustrates the computer 102 of FIG. 5A with the audio and video of Persons A and B enhanced. As can be FIG. 5C the images of Persons A and B are enlarged and are approximately equal in size to the image of Person C. Similarly, although not shown in FIG. 5C, the audio from each Person A and Person B is also enhanced. Furthermore, the non-enhanced Persons C and D may be minimized or hidden in order to more greatly enhance Person A and Person B. Or, Persons C and D may remain approximately the same so that Persons A and B may be approximately the same size as Persons C and D. Moreover, the enhancement of Persons A and Person B may include not only his or her image but also other settings. For example, if each person is in a separate chat window, the window of the speaking person (e.g., Person A or Person B) may be enhanced, e.g., the chat widow may change colors, include a border or modify the border, the window may be enlarged, pulled to the front of the display, and so on.

Figure 6:
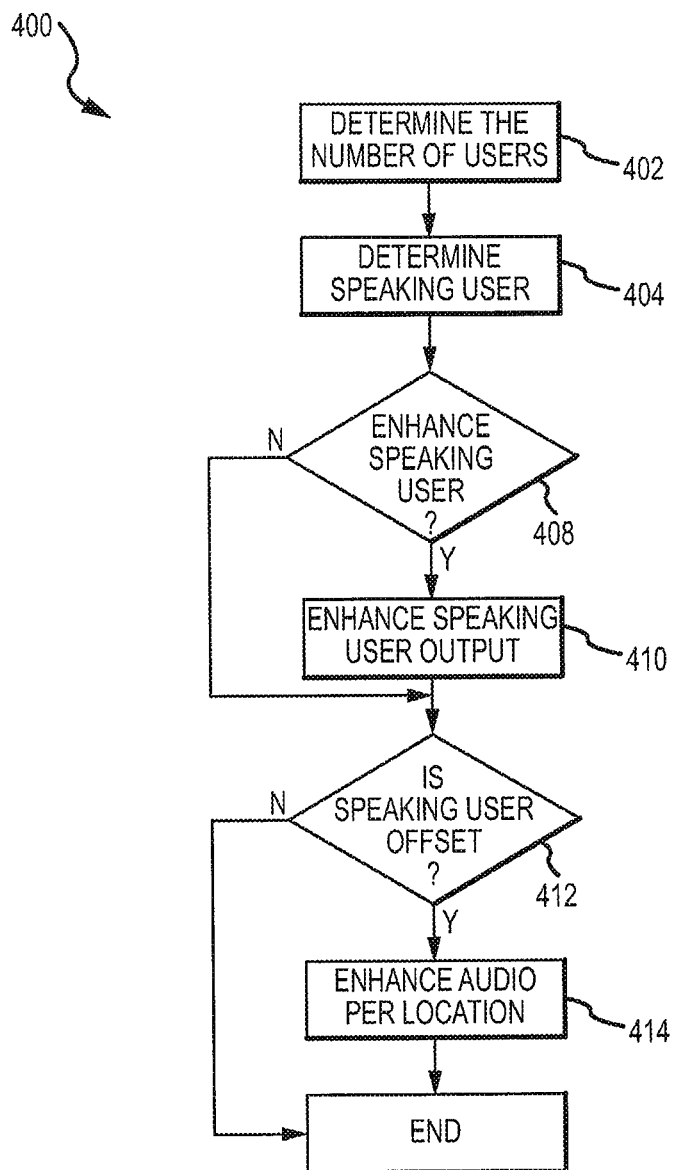
FIG. 6 is a flow chart illustrating an exemplary method for enhancing the audio and/or video of a particular person during a video conferencing session as illustrated in FIGS. 5A-5C.

FIG. 6 is a flow chart illustrating an exemplary method for enhancing the audio and/or video of a particular person during a video conferencing session as illustrated in FIGS. 5A-5C. The method 400 may begin with operation 402 and the computer 102 may determine whether there are multiple users or people associated with a particular video conferencing session. The computer 102 may present an option to the user to allow a user to enter the number of people, or the computer 102 may determine the number of users via facial recognition, voice recognition, total conferencing sessions or display computers, and the like. It should be noted that a person or user participating in the video conferencing session may be determined to be separate (e.g., each at a separate computer), collectively (e.g., multiple users per computer), or a combination of the separate and collective (e.g., some users are separate and some are collective).

In one example, as shown in FIGS. 5A-5C, the computer 102 may determine that there are four persons (Persons A-D), although each Person A-D may be in front of the single computer 102. The computer 102 may utilize facial recognition, voice recognition, and other various sensors to determine the number of people present in front of the computer 102. However, in other instances, each of Persons A-D may be in front of separate computers, but grouped together on the display of computer 102 to present a single interface of the video conferencing.

Once the method 200 determines the number of users, it may proceed to operation 404. Operation 404 determines which user (of the number of users) is speaking, if any. The computer 102 may determine whether a user is speaking by voice recognition, audio sensors, imaging data, or the like. Once the speaking user is determined, the method 400 may proceed to operation 406 and the computer 102 may steer or directed the sensors such as audio input sensors (microphones) towards the speaking user. For example, the audio input sensors may be rotated towards the speaking user, or a directional microphone may be activated or steered towards the speaking user.

After the audio input sensors have been beam steered or otherwise directed towards the speaking user, the method 400 may proceed to operation 408. Operation 408 determines whether a user (or the computer 102) may wish to enhance the output video to focus on the speaking user. For example, after the speaking user is determined, the computer 102 may present an option to the viewing user on whether he or she wishes for the speaking user video image to be focused. Or, alternatively, the computer 102 may automatically enhanced the output of the speaking user, which may be a setting of a video conferencing application.

If, in operation 408 the video output of the speaking user is to be enhanced, the method 400 proceeds to operation 410 and the video output and/or video input (e.g., video sensor 134) may be enhanced so as to zoom in or focus on the speaking user. For example, as shown in FIG. 5C, the output video of Persons A and Person B may be enhanced so that Persons A and B may appear closer to the screen than Person C.

After operation 410 or if in operation 408 the output video is not focused on the speaking user, the method 400 may proceed to operation 412. Operation 412 determines whether the speaking user is located offset from a middle of the display 104. For example, the computer 102 may utilize facial recognition, audio recognition or the like to determine where on the display 104 the speaking user is located. For example, the computer 102 may determine that Person A is speaking and that he or she is being displayed on display 104 on the right side of the screen. However, if in operation 412 Person C is the speaking user, the computer 102 may determine that speaking user is located substantially in the middle of the display 104.

If in operation 412, the speaking user is located off-set from the middle of the display 104, the method 400 may proceed to operation 414. Operation 414 enhances the audio output of the video conferencing so that the audio of the speaking user may be angled towards a side of the display 104 on which the speaking user is displayed. For example, with the arrangement shown in FIG. 5C, the audio output devices 106, 110 may be set so as to have the audio sound as though its coming from the location of the speaking user, that is, the right side of the display screen 104. In this manner, the viewing/watching user may hear the audio from the speaking user from a location whether the user is displayed.

Corresponding Audio with Location

Figure 7A:
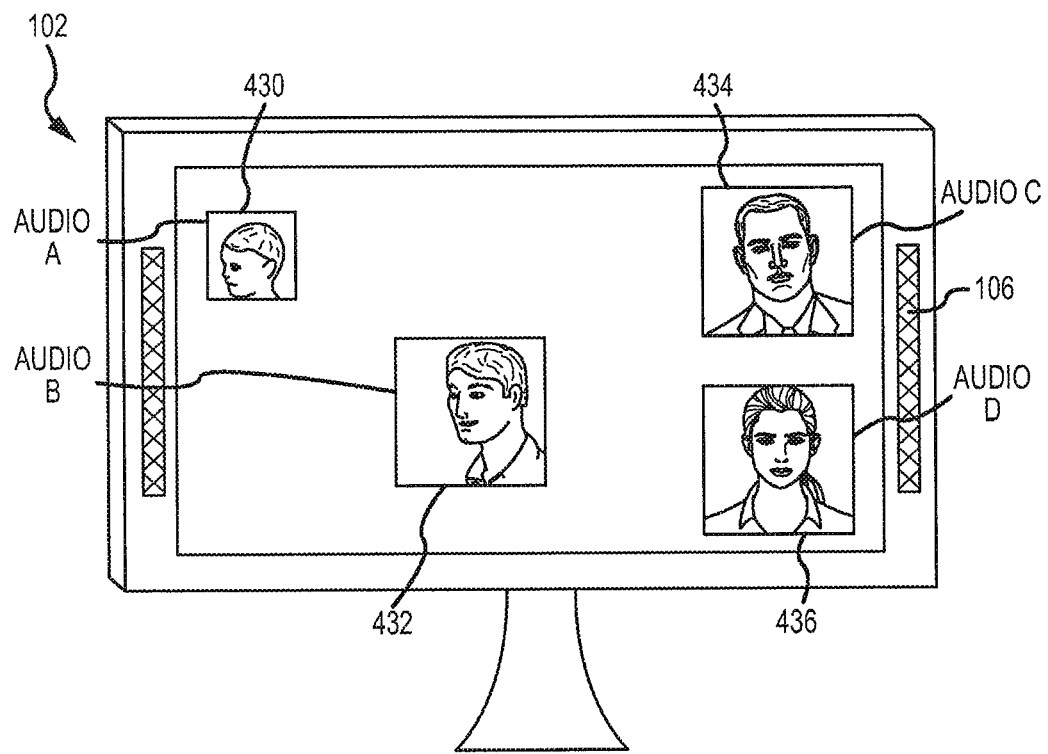
FIG. 7A is a diagram of the computer with an instant messaging, voice, or video chat program running and displaying multiple instances.

In other embodiments, the system 100 may be configured to alter an audio output based on a location of a video conferencing window or instance. FIG. 7A illustrates the computer 102 with an instant messaging, voice, or video chat program running. For example, the computer 102 may be running a program such as iCHAT or Facetime by Apple, Inc. The display may include multiple chat instances 430, 432, 434, 436 with each window including its own audio Audio A, Audio B, Audio C, and Audio D, respectively. Additionally, each chat instance may include a corresponding image, such as a video image or a photograph.

Figure 8:
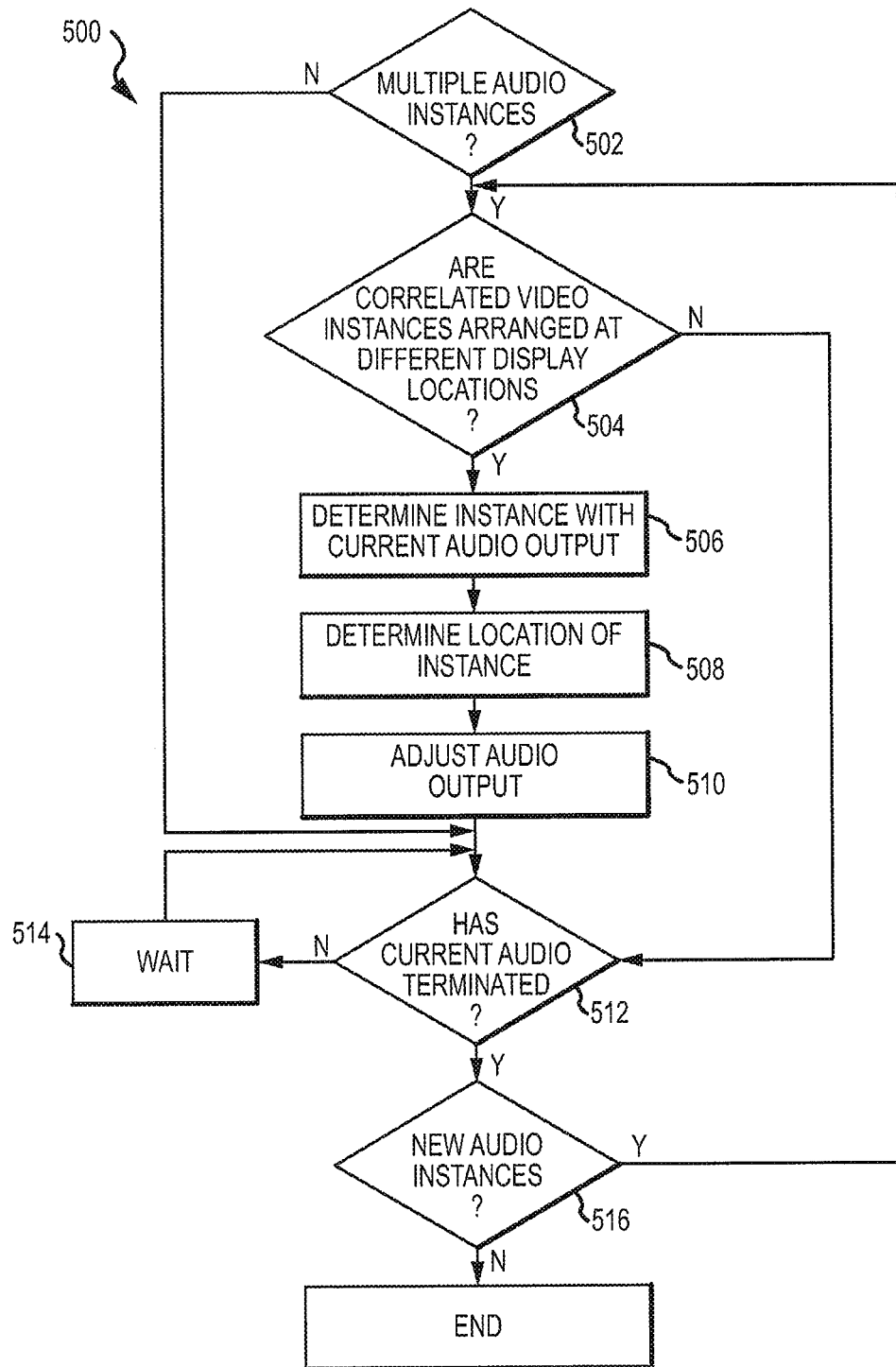
FIG. 8 is a flow chart illustrating an exemplary method for directing the audio of a particular audio/video instance.

FIG. 8 is a flow chart illustrating an exemplary method 500 for directing the audio of a particular chat instance to be output so as to sound as if it is originating form a location corresponding to a location of the chat instance. The method 500 may begin with operation 502 and the computer 102 may determine if there is more than one chat instance. For example, the computer 102 may determine whether there are multiple audio instances that may correspond to different chat instances. If there is not more than one audio or chat instance, the method 500 may proceed to operation 512, which will be discussed in more detail below.

If, in operation 502 there is more than one audio or chat instance the method 500 may proceed to operation 504. Operation 504 determines whether the chat instances are arranged in different locations on the display 104. For example, the chat instances may be overlaid on top of one another, minimized, or (as shown in FIG. 7A), dispersed at various locations on the display screen 104. If, in operation 504, the computer 102 determines that the chat instances are located at different positions on the display 104, the method 500 may proceed to operation 506.

Operation 506 determines the user is speaking or which instance has an audio output. For example, the computer 102 determines whether Audio A, Audio B, Audio C, or Audio D is currently producing any sounds, which may correlate to whether a user is speaking or otherwise providing a sound to transmit to the viewing user. Once operation 506 determines an audio that currently has an output, the method 500 may proceeds to operation 508. Operation 508 determines the location of the output audio, that is, which chat instance (and its location) correlates to the respective audio. For example, if Audio A currently has an output, the computer 102 determines the location (relative to the display 104) of chat instance 430.

Figure 7B:
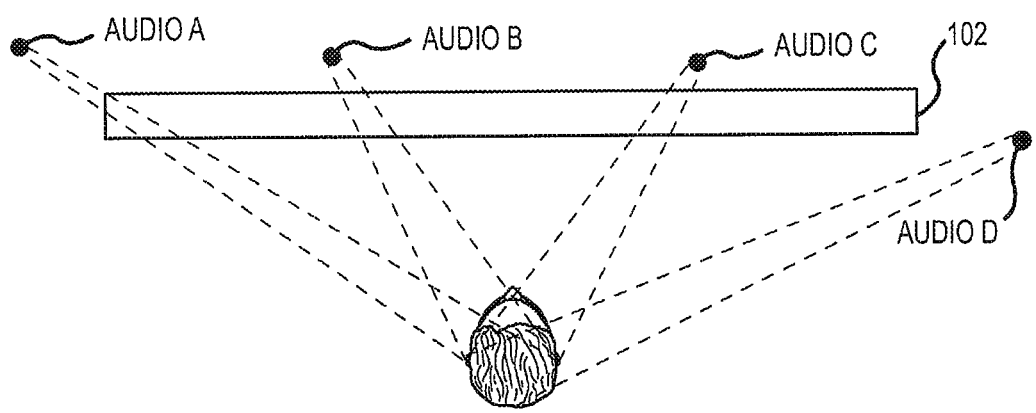
FIG. 7B is a diagram of an audio direction for Audios A, B, C, D corresponding to multiple audio/video instances of FIG. 7A.

After operation 508, the method 500 may proceed to operation 510 and the computer 102 may modify the audio output from speakers 106, 110 or other output devices to exit from (or appear to exit from) the location of the chat instance. For example, as shown in FIG. 7A, if Audio A has an output, the speakers 110 may be modified so that the audio of Audio A may appear to be directed from the area of the chat instance. FIG. 7B illustrates the audio direction for Audios A-D that correspond to chat instances 430, 432, 434, 436 respectively. As can be seen in FIG. 7B, the audio may be directed towards the user in a manner that may correlate to the chat instance location on the display 104. This may allow the user to hear the audio from any of Audios A-D as though they were output from the location of the chat instance. This may provide a more realistic chatting experience of the user in a video conferencing or video chat application. Additionally, the directional audio may also enhance the audio experience of the user during the chat session.

After operation 510 or after operation 504, the method 500 may proceed to operation 512. Operation 512 determines whether the current audio has terminated, e.g., whether a particular person has finished talking. The computer 102 may determine this by facial recognition, if the chat includes a video image, or may be done by audio processing, speech recognition, or other processing techniques. If the audio for a particular chat instance has not terminated, the method 500 may proceed to operation 514 and the computer 102 may wait or pause for a select time. If, on the other hand, the audio of the selected chat instance has terminated, the method 500 may proceed to operation 516. Operation 516 determines whether there is a new audio active for one of the chat instances. If there is a new audio, the method 500 may return to operation 504. However, if there is not another audio the method 500 may terminate.

CONCLUSION

The foregoing description has broad application. The discussion of any embodiment is meant only to be exemplary and is not intended to suggest that the scope of the disclosure, including the claims, is limited to these examples.

What is claimed is:

1. A viewing user's computing device, comprising:
a processor that is to be in communication with an audio output device and a display screen and configured to receive first images from first a video camera of a first location, and first audio from a first plurality of microphones of the first location, that capture a first user, receive second images from a second video camera of the second location, and second audio from a second plurality of microphones of the second location, that capture a second user, present the received first images in a first chat window, and the received second images in a second chat window simultaneously with the first chat window to a viewing user through the display screen of the viewing user's computing device and wherein each of the first chat window and the second chat window has its own audio as the first audio and the second audio, respectively, being simultaneously output through the audio output device, select one of the first user or the second user, by detecting the viewing user's tap on an image of the first user in the first chat window or the second user in the second chat window on the display screen, determine when the selected user is speaking, and focus on the selected user, by transmitting a signal to the first location or the second location of the selected user to process the first audio from the first plurality of microphones or the second audio from the second plurality of microphones for beam steering to better capture the selected user.

2. The computing device of claim 1 wherein the processor is further configured to focus on the selected user by digitally enhancing the first audio or the second audio by filtering different channel signals to enhance or to reduce particular frequencies.

3. The computing device of claim 2 wherein the processor is configured to present an option to the viewing user on whether to focus on a selected user.

4. The computing device of claim 3 wherein the processor is further configured to digitally enhance the image of the selected user according to the option presented to the viewing user.

5. The computing device of claim 1 wherein the processor is further configured to present an option to the viewing user on whether to focus on a selected user.

6. The computing device of claim 5 wherein the processor is configured to digitally enhance the first images or the second images from the video camera according to the option presented to the viewing user.

7. The computing device of claim 6 wherein an image of the first user as presented in the first images through the display screen is smaller than an image of the second user as presented in the second images through the display screen, until the focus on the selected user being the first user digitally enhances the image of the first user.

8. The computing device of claim 1 wherein the first audio as presented through the audio output device is quieter than the second audio as presented through the audio output device until the focus on the selected user being the first user digitally enhances the first audio.

9. The computing device of claim 1 wherein the processor is further configured to automatically enhance an image of the first user or an image of the second user being presented on the display screen, according to a setting of a video conferencing application.

10. The computing device of claim 9 wherein the processor is to enhance the image of the first user or the second user by changing a color of a chat window containing the image or by pulling the chat window to a front of the display screen.

11. A method performed by a processor executing a video conferencing application in a viewing user's computing device, the method comprising:

receiving first images from a first video camera of a first location and first audio from a plurality of microphones of the first location, that capture a first user;

receiving second images from second a video camera of a second location and a second audio from a plurality of microphones of the second location, that capture a second user;

presenting the received first images in a first chat window, and the received second images in a second chat window simultaneously with the first chat window through a display screen of the viewing user's computing device, wherein each of the first chat window and the second chat window has its own audio as the first audio and the second audio, respectively, being simultaneously output through an audio output device of the viewing user's computing device;

selecting one of the first user or the second user, by detecting the viewing user's tap on an image of the first user in the first chat window or the second user in the second chat window on the display screen;

determining when the selected user is speaking; and focusing on the selected user, by transmitting a signal to the first location or the second location of the selected user to process the first audio from the plurality of microphones or the second audio from the second plurality of microphones from beam steering to better capture the selected user.

12. The method of claim 11 wherein the first plurality of microphones are spaced around a perimeter of a display screen at the first location.

13. The method of claim 12 wherein focusing on the selected user further comprises digitally enhancing the first audio or the second audio by filtering different channel signals to enhance or to reduce particular frequencies.

14. The method of claim 12 further comprising
presenting an option to the viewing user on whether to focus on a selected user.

15. The method of claim 14 further comprising
digitally enhancing the first images or the second images according to the option presented to the viewing user.

16. The method of claim 12 further comprising
automatically enhancing the first images or the second images, according to a setting of a video conferencing application.

17. The method of claim 11 wherein focusing on the selected user further comprises digitally enhancing the first audio or the second audio by filtering different channel signals to enhance or to reduce particular frequencies.

18. The method of claim 11 further comprising
presenting an option to the viewing user on whether to focus on a selected user.

19. The method of claim 18 further comprising
digitally enhancing the first images or the second images according to the option presented to the viewing user.

20. The method of claim 11 further comprising
automatically enhancing the first images or the second images, according to a setting of a video conferencing application.

21. A viewing user's computing device, comprising:
an audio output device;
a display screen; and a processor that is to be in communication with the audio output device and the display screen and configured to receive first images from a first video camera of a first location, and first audio from a first plurality of microphones of the first location, that capture a first user, receive second images from a second video camera of a second location, and second audio from a second plurality of microphones of the second location, that capture a second user, present the received first images in a first chat window and the received second images in a second chat window simultaneously with the first chat window through the display screen, and wherein each of the first chat window and the second chat window has its own audio as the first audio and the second audio, respectively, being simultaneously output through the audio output device, select one of the first user or the second user, by detecting the viewing user's tap on an image of the first user in the first chat window or the second user in the second chat window on the display screen, determine when the selected user is speaking, and focus on the selected user, by transmitting a signal to the first location of the second location of the selected user to process the first audio from the first plurality of microphones or the second audio from the second plurality of microphones for beam steering to better capture the selected user.

22. The computing device of claim 21 wherein the processor is further configured to digitally enhance the first audio or the second audio by filtering different channel signals to enhance or to reduce particular frequencies.

23. The computing device of claim 21 wherein the processor is configured to present an option to the viewing user on whether to focus on a selected user.

* * * * *